United States Patent
Bourke et al.

(10) Patent No.: US 7,100,877 B2
(45) Date of Patent: Sep. 5, 2006

(54) COLLAPSIBLE TWO TIER SUPPORT

(76) Inventors: Timothy Bourke, 732 Casemer, Lake Orion, MI (US) 48360; Dorothy Bourke, 732 Casemer, Lake Orion, MI (US) 48360

( * ) Notice: Subject to any disclaimer, the term of this patent is extended or adjusted under 35 U.S.C. 154(b) by 0 days.

(21) Appl. No.: 10/880,958

(22) Filed: Jun. 30, 2004

(65) Prior Publication Data
US 2005/0001115 A1    Jan. 6, 2005

Related U.S. Application Data

(60) Provisional application No. 60/483,699, filed on Jun. 30, 2003.

(51) Int. Cl.
*F16M 11/38*    (2006.01)
(52) U.S. Cl. ............. 248/166; 248/167; 248/165; 248/434; 297/45; 297/42; 211/200; 108/118
(58) Field of Classification Search ............... 248/166, 248/171, 169, 165, 164, 434, 188.6, 440; 297/42, 45, 16.2, 16.1, 232; 108/118; 211/200
See application file for complete search history.

(56) References Cited

U.S. PATENT DOCUMENTS

| | | | | |
|---|---|---|---|---|
| 3,136,272 | A * | 6/1964 | Sprigman | 108/118 |
| 6,073,894 | A * | 6/2000 | Chen | 248/165 |
| 6,193,308 | B1 * | 2/2001 | Hwang | 297/171 |
| 6,231,119 | B1 * | 5/2001 | Zheng | 297/16.2 |
| 6,247,748 | B1 * | 6/2001 | Zheng | 297/16.2 |
| 6,247,749 | B1 * | 6/2001 | Yu | 297/16.2 |
| 6,382,729 | B1 * | 5/2002 | Wu | 297/452.41 |
| 6,454,348 | B1 * | 9/2002 | Wu | 297/16.2 |
| 6,505,885 | B1 * | 1/2003 | Tang | 297/16.2 |
| 6,776,433 | B1 * | 8/2004 | Harrison et al. | 280/647 |

\* cited by examiner

*Primary Examiner*—Kimberly Wood
(74) *Attorney, Agent, or Firm*—John R. Benefiel

(57) ABSTRACT

A collapsible two tier support as for use in camping dishwashing is formed by four uprights connected by pivoted cross brace sets and having a fabric panel defining on upper support connected to the tops. Additional cross brace sets support a second fabric panel at a lower level adjacent the uprights. The entire assemblage is collapsible by pivoting action of the cross brace members.

6 Claims, 4 Drawing Sheets

US 7,100,877 B2

COLLAPSIBLE TWO TIER SUPPORT

CROSS REFERENCE TO RELATED APPLICATIONS

This application claims the benefit of U.S. provisional Ser. No. 60/483,699, filed Jun. 30, 2003.

BACKGROUND OF THE INVENTION

This invention concerns collapsible portable supports as used in camping for chairs, tables, etc. The collapsible design allows these items to be brought along on camping trips since the amount of space required in a vehicle is greatly reduced.

Camping usually involves cooking and washing of utensils, dishes, etc. Heretofore, washing the dishes has been quite inconvenient when, with the water stored in an often collapsible heavy jug and rinsing and washing in separate dishpan being quite awkward. Dispensing water from a large jug is also itself inconvenient.

It is an object of the present invention to provide a collapsible two tier support for convenient washing of dishes in a pan on a lower support and dispensing of water from a water jug on an adjacent upper support.

SUMMARY OF THE INVENTION

The above object and others which will be understood upon a reading of the following specification and claims are achieved by a two tier collapsible support. The support is formed by four elongated uprights arranged vertically spaced apart and parallel to each other in a rectangle with a fabric panel attached at their upper ends to provide a first generally planar support surface as for holding a water jug. The four uprights have pivoted cross brace sets interconnected to respective pairs of adjacent uprights to be braced in their spaced apart position.

Four sets of pivoted cross braces, each connected to an adjacent pair of uprights have brace members having a pivotal connection together with the bottom ends of the uprights to connector pieces. The upper ends of the brace members are connected to connector pieces slidable on a respective upright at an intermediate region thereof.

A second fabric rectangular panel support is connected on one side of one pan of the uprights by an additional three sets of pivoted cross braces, arranged in a rectangle together with one of the cross brace sets interconnecting the uprights. The second fabric panel provides a second panel horizontal support surface at a lower height than the first horizontal support surface and immediately adjacent thereto.

The entire assemblage can be collapsed laterally to bring all four uprights and cross brace members together by pivoting of the cross brace members.

DETAILED DESCRIPTION

Figure 1:
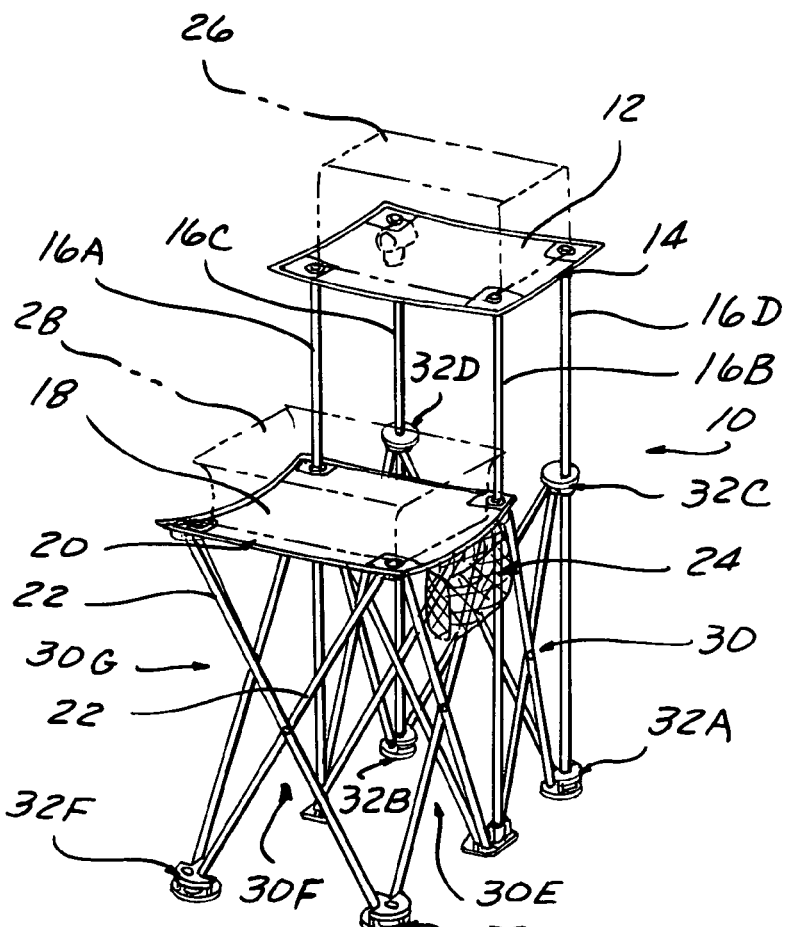
FIG. 1 is a pictorial view of a two tier collapsible support according to the present invention, with supported items shown in phantom lines.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, and particularly FIGS. 1–4, a collapsible two tier support 10 according to the invention includes an upper generally planar support surface 12 provided by a rectangular durable (nylon, etc.) fabric panel 14 attached at each corner to an upper end of a respective elongated upright 16.

A second lower generally planar support surface 18 is provided adjacent and below the upper support surface 16 by a rectangular fabric panel 20 attached to two forward corners to the top ends of two cross brace members 22, and at two rear corners to two of the uprights 16A, 16B at an intermediate height as well as the upper ends of the cross brace set members interconnecting the uprights 16A, 16B.

A mesh material storage bag 24 can be attached to one side of the lower fabric panel 20.

This arrangement provides a planar support for a water jug 26 on the upper support surface 12 above a dishpan 28 on the lower support surface 20 for convenient dishwashing.

Each pair of the uprights 16 are interconnected by one of four cross brace sets 30A, B, C, D, respectively mounted between each adjacent pair of uprights 16 by bottom connector pieces 32A, B and 34A, B and intermediate connector pieces which comprise inverted connector pieces 32C, D and 34C, D.

Such connector pieces are commercially available and used in other types of collapsible furniture.

Figure 6:
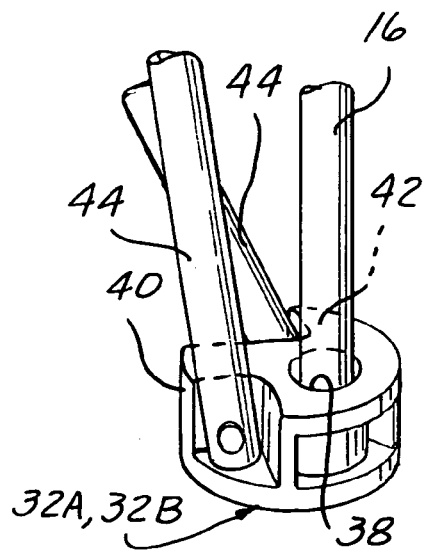
FIG. 6 is an enlarged pictorial view of the rear upright connector-cross bracing connector pieces, with a fragmentary portion of a rear upright and a cross bracing member.
Figures 2, 7, 8:
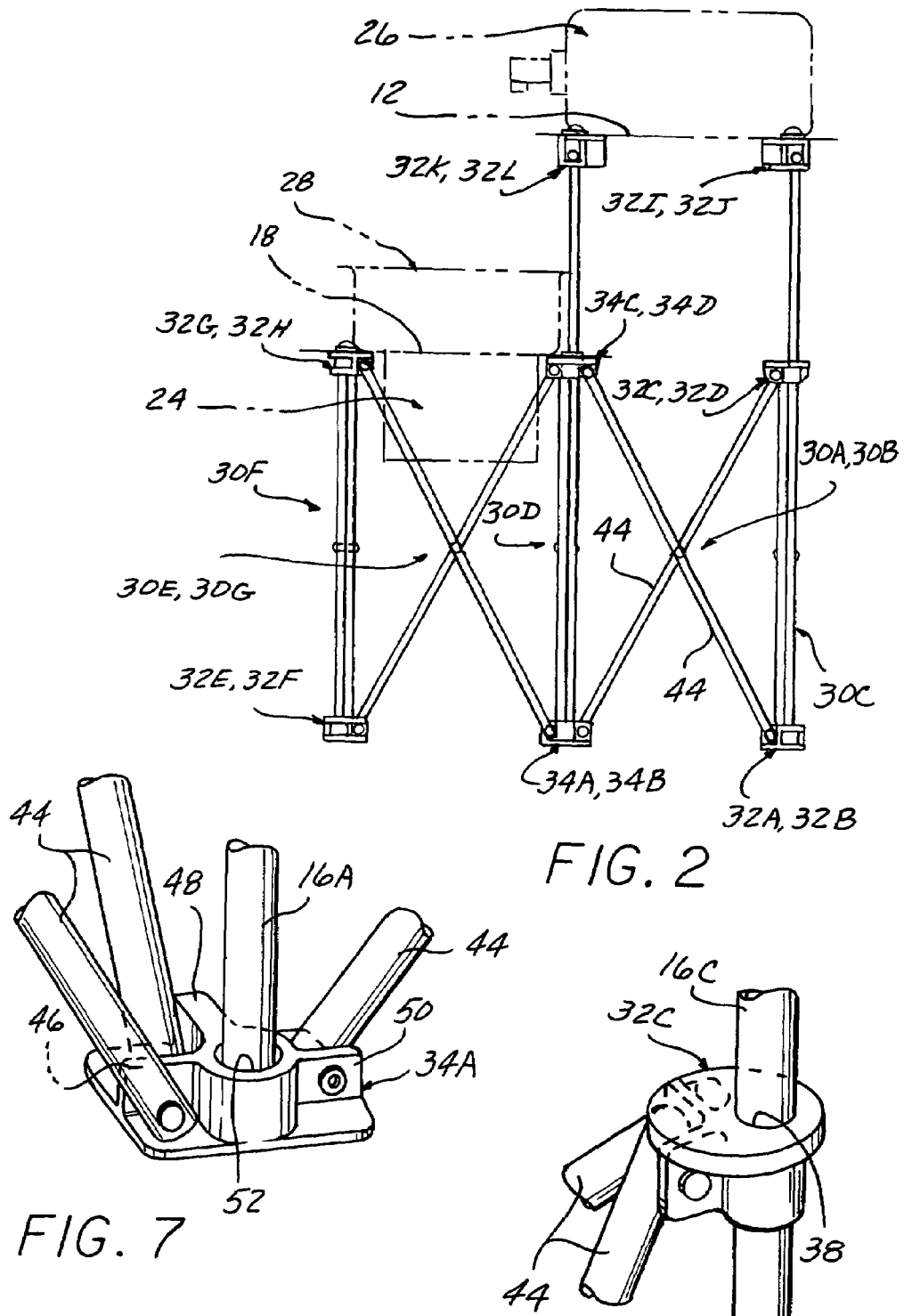
FIG. 2 is a side elevational view of the two tier collapsible support shown in FIG. 1.
FIG. 7 is an enlarged pictorial view of a connector piece connecting the forward pair of uprights to members of three adjacent cross bracing sets, with a fragmentary view of the adjacent portions of the upright and cross brace set members.
FIG. 8 is an enlarged pictorial view of a sliding connector piece fixed to a cross bracing member and slidable on an upright, portions of both shown in fragmentary form.
Figure 3:
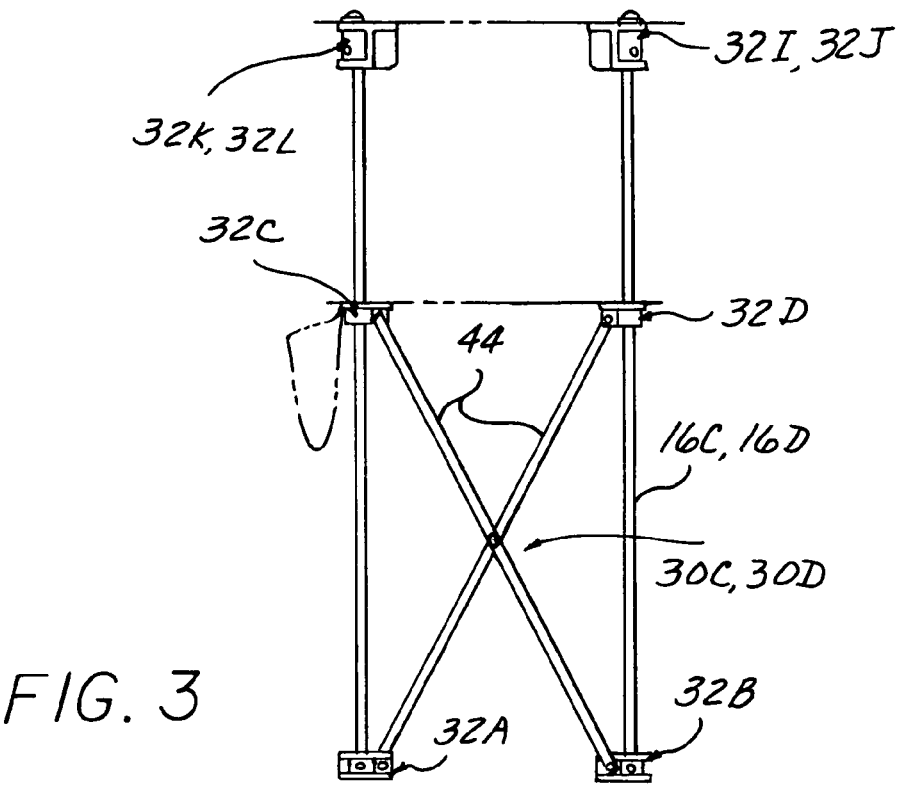
FIG. 3 is a front view of the two tier collapsible support shown in FIGS. 1 and 2.

Connector pieces 32A–D (FIG. 6) comprised molded plastic bodies having a vertical hole 38 able to receive the lower end of an upright 16 (secured with a screw, not shown) and walls 40, 42 to which the lower ends of two cross brace members 44 are pivotally attached.

Connector pieces 32C, D (FIG. 8) are the same as connector pieces 32A, B but are inverted to receive the upper ends of cross brace members 44. The uprights 16C, D pass completely through holes 38 and are slidable thereon.

Connector pieces 34A, B (FIG. 7) are also molded plastic bodies which have three vertical walls 46, 48, 50 to which are pivotally attached to the lower ends of three cross brace members 44, and a hole 52 receiving a lower end of an upright 16A or 16B.

Connector pieces 34C, D are the same but are inverted and slidable on the uprights 16A, B along an intermediate section thereof.

There are three forward cross brace sets 30E, F, G arranged in a rectangle with the forward cross brace set 30D between uprights 16C, D.

Figure 5:
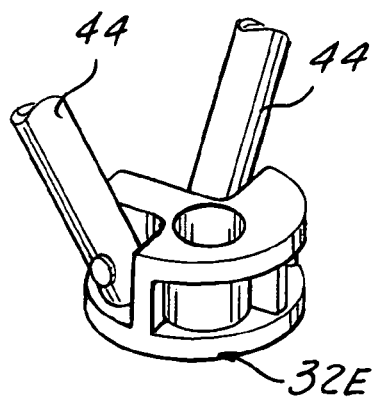
FIG. 5 is an enlarged pictorial view of one of the short upright cross bracing connector pieces incorporated in the two tier support shown in FIGS. 1–4, with fragmentary portions of the connected upright and cross bracing member.

The lower ends of formed cross brace members 44 of the cross brace sets are pivotally mounted to connector pieces 32 E, F (FIG. 5) configured the same as connector pieces 32A–D.

The lower ends of the rear cross brace members 44 of cross brace sets 30E, G are secured in connector pieces 34A, B.

The upper ends of the forward cross brace members 44 of cross brace sets 30E, F, G are pivoted to inverted connector pieces 32G, H.

The rear upper ends of cross braces 30E, G are pivotally mounted to connector pieces 34D, C.

Figure 9:
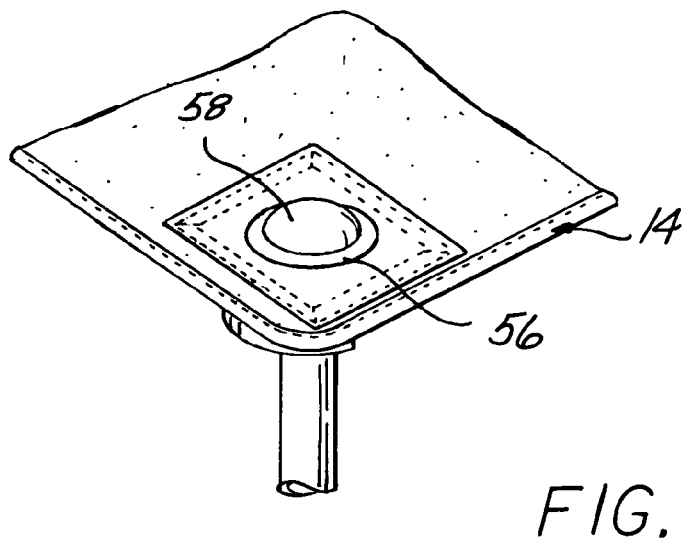
FIG. 9 is a fragmentary pictorial view of one corner of fabric panel forming an upper planar support and adjacent portion of an upright.
Figure 10:
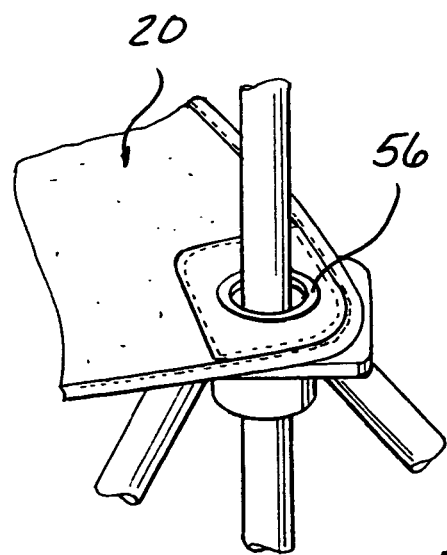
FIG. 10 is a fragmentary pictorial view of an inside corner of a fabric panel forming a lower horizontal support and adjacent portions of an upright and cross bracing members.

The fabric panels 14, 20 each have grommets at their corners (FIGS. 9, 10). The upper fabric panel 20 is secured with headed plastic pieces 58 secured with screws (not shown) passing up through associated connector pieces 32I, J.

Figure 4:
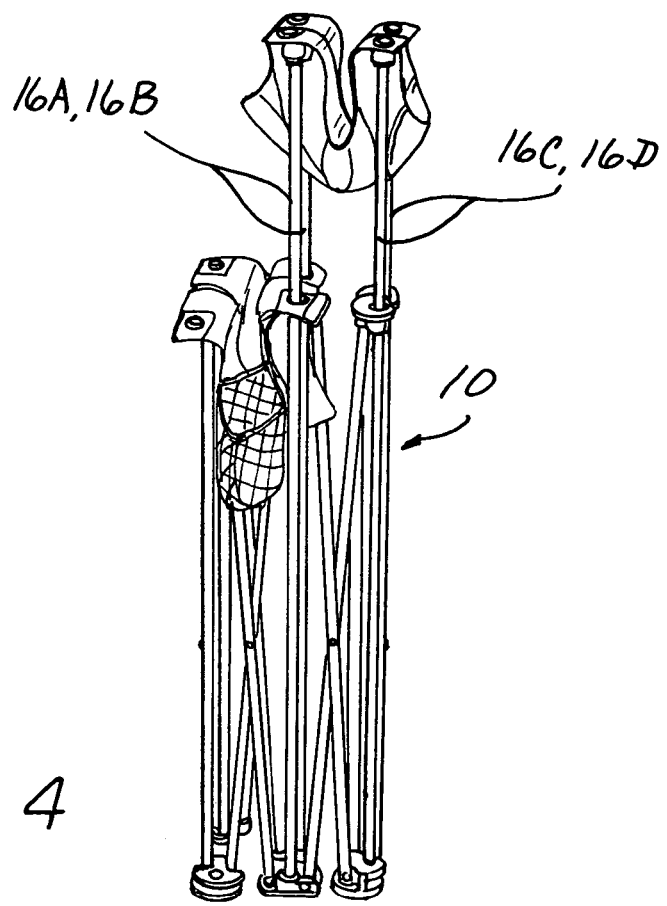
FIG. 4 is a pictorial collapsed view of the collapsible support shown in FIGS. 1–3.

The entire assemblage can be collapsed by lifting, the same and pushing the uprights 16 and cross braces 30E, F, G together in both orthogonal horizontal directions, to the greatly compacted condition shown in FIG. 4 with the fabric panels 14–20 folded up between associated the uprights and cross braces.

This allows for convenient storage and transport to provide a practical use in camping expeditions.

The invention claimed is:

1. A collapsible two tier support comprising:
   a set of four elongated uprights arranged to form a rectangular pattern;
   a pivoted cross brace set interposed between each adjacent pair of uprights and connected thereto to be slidable thereon to be collapsible, with at least one of said cross brace sets substantially lower in height than said uprights;
   a first fabric panel attached to the top of said uprights to define a generally planar support surface with said uprights fully spaced apart, but able to collapse when said uprights are pushed together to fold together said first fabric panel between said uprights;
   three additional cross brace sets which together with said at least one cross brace set ranged to form a second rectangular pattern adjacent one side of said rectangular pattern formed by said uprights, said additional three cross brace sets of a height substantially equal to said at least one cross brace set;
   two of said three cross brace sets slidably connected to two of said uprights to be collapsible; and
   a second fabric panel attached to the upper ends of said additional three cross brace sets to create a second generally planar support surface at a substantially lower level than said first fabric panel with said uprights fully spaced apart and said three additional cross bracing sets expanded, said second fabric panel able to be collapsed when said additional three cross bracing sets are collapsed to fold said second fabric panel together between said three additional cross bracing sets, whereby a completely collapsible two tier support is provided.

2. A collapsible two tier support according to claim 1 wherein each cross brace set comprises a pair of elongated crossing members pivoted together at an intermediate point along their lengths.

3. A collapsible two tier support according to claim 2 wherein each upright and the lower ends of two crossing members are secured to a common connector piece.

4. A collapsible two tier support according to claim 2 wherein the upper end of each crossing member is pivoted to one of a series of four connectors each slidable on a respective upright.

5. A collapsible two tier support according to claim 2 wherein said first and second fabric panels are rectangular and are connected at each corner thereof to said uprights and cross brace members respectively.

6. A collapsible two tier support according to claim 1 wherein said second fabric panel has an open topped storage bag attached to one side.

* * * * *

UNITED STATES PATENT AND TRADEMARK OFFICE
CERTIFICATE OF CORRECTION

| | |
|---|---|
| PATENT NO. | : 7,100,877 B2 |
| APPLICATION NO. | : 10/880958 |
| DATED | : September 5, 2006 |
| INVENTOR(S) | : Timothy Bourke et al. |

It is certified that error appears in the above-identified patent and that said Letters Patent is hereby corrected as shown below:

Col. 4 Claim 1, line 7, delete "ranged" and insert -- arranged --.

Signed and Sealed this

Nineteenth Day of December, 2006

JON W. DUDAS
*Director of the United States Patent and Trademark Office*